United States Patent
Vembu et al.

(10) Patent No.: US 12,386,597 B2
(45) Date of Patent: Aug. 12, 2025

(54) ROLE EXTENSIONS FOR PROGRAMMING LANGUAGES

(71) Applicant: Zoho Corporation Private Limited, Kanchipuram District (IN)

(72) Inventors: Sridhar Vembu, Tenkasi (IN); Akshhayaa S, Kanchipuram District (IN)

(73) Assignee: Zoho Corporation Private Limited, Kancheepuram District (IN)

( * ) Notice: Subject to any disclaimer, the term of this patent is extended or adjusted under 35 U.S.C. 154(b) by 204 days.

(21) Appl. No.: 18/335,035

(22) Filed: Jun. 14, 2023

(65) Prior Publication Data
US 2023/0409301 A1  Dec. 21, 2023

Related U.S. Application Data

(60) Provisional application No. 63/370,361, filed on Aug. 3, 2022.

(30) Foreign Application Priority Data

Jun. 21, 2022  (IN) .............................. 202241035496

(51) Int. Cl.
G06F 8/41  (2018.01)
(52) U.S. Cl.
CPC .............. G06F 8/427 (2013.01); G06F 8/437 (2013.01)
(58) Field of Classification Search
CPC ....................................................... G06F 8/437
See application file for complete search history.

(56) References Cited

U.S. PATENT DOCUMENTS

| | | | |
|---|---|---|---|
| 5,748,966 A | 5/1998 | Sato | |
| 6,918,107 B2 * | 7/2005 | Lucas | G06F 8/447 717/124 |
| 7,389,498 B2 * | 6/2008 | Meijer | G06F 8/437 717/114 |
| 7,694,274 B2 | 4/2010 | Meijer et al. | |
| 7,801,926 B2 * | 9/2010 | Hunter | G06F 9/4493 715/255 |
| 7,917,534 B2 | 3/2011 | Demiroski et al. | |

(Continued)

FOREIGN PATENT DOCUMENTS

CN  106415495 A  *  2/2017  ........... G06F 21/577

OTHER PUBLICATIONS

Bettini, Lorenzo, et al. "TraitRecordJ: A programming language with traits and records." Science of Computer Programming 78.5 (2013): 521-541.*

(Continued)

*Primary Examiner* — Francisco J Aponte
(74) *Attorney, Agent, or Firm* — Silicon Edge Law Group LLP; Arthur J. Behiel (57) ABSTRACT

A programming language and compiler support inheritance and type extensions. Program code defines user-defined independent and dependent-link data types. Elements of an independent data type can be inherited by a dependent-link data type that can extend the scope of the independent data type and the scope of one or more elements of the independent data type. Data types and type extensions are instantiated in memory as uniquely identified objects that reference one another in a manner that controls inter-object access.

19 Claims, 6 Drawing Sheets

(56) References Cited

U.S. PATENT DOCUMENTS

| | | | | |
|---|---|---|---|---|
| 8,055,907 | B2* | 11/2011 | Deem | G06F 9/44 |
| | | | | 713/193 |
| 8,225,294 | B2* | 7/2012 | Ryu | G06F 8/437 |
| | | | | 717/148 |
| 8,332,385 | B2* | 12/2012 | Moor | G06F 8/437 |
| | | | | 707/713 |
| 8,713,515 | B1* | 4/2014 | Biggerstaff | G06F 8/72 |
| | | | | 717/137 |
| 8,893,082 | B2* | 11/2014 | Naden | G06F 9/4488 |
| | | | | 717/114 |
| 9,053,028 | B2* | 6/2015 | Taillefer | G06F 12/145 |
| 9,075,630 | B1* | 7/2015 | Smith | G06F 8/35 |
| 9,361,129 | B2* | 6/2016 | Le Roy | G06F 9/4488 |
| 9,513,880 | B2* | 12/2016 | Avadhanula | G06F 8/10 |
| 9,563,412 | B2* | 2/2017 | Hoban | G06F 8/437 |
| 9,639,335 | B2* | 5/2017 | Hoban | G06F 8/437 |
| 9,710,243 | B2* | 7/2017 | O'Hara | G06F 8/71 |
| 9,760,653 | B2* | 9/2017 | Liu | G06F 8/30 |
| 10,169,004 | B2* | 1/2019 | Khoyi | G06F 3/04847 |
| 10,437,572 | B1* | 10/2019 | Ghaleb | G06F 40/284 |
| 10,929,106 | B1 | 2/2021 | Sridhar | |
| 10,963,228 | B1* | 3/2021 | Samuel | G06F 8/437 |
| 11,042,699 | B1* | 6/2021 | Sayre | G06F 40/18 |
| 11,210,459 | B1* | 12/2021 | Krishnaswamy | G06F 40/166 |
| 11,403,074 | B1* | 8/2022 | Gandhi | G06F 9/542 |
| 2006/0225053 | A1* | 10/2006 | Lakshman | G06F 8/437 |
| | | | | 717/106 |
| 2010/0037213 | A1* | 2/2010 | Meijer | G06F 8/427 |
| | | | | 717/144 |
| 2011/0276950 | A1* | 11/2011 | Fisher | G06F 8/437 |
| | | | | 717/140 |
| 2014/0130016 | A1* | 5/2014 | Menghrajani | G06F 11/3604 |
| | | | | 717/124 |
| 2014/0282443 | A1 | 9/2014 | Hoban et al. | |
| 2014/0380276 | A1 | 12/2014 | Matthiesen et al. | |
| 2017/0123762 | A1* | 5/2017 | Drukman | G06F 8/33 |
| 2017/0322783 | A1* | 11/2017 | Khoyi | G06F 3/04847 |
| 2018/0260197 | A1* | 9/2018 | Tsingauz | G06F 8/427 |
| 2019/0114160 | A1* | 4/2019 | Yehuda | G06F 8/70 |
| 2019/0129696 | A1* | 5/2019 | Ibrahim | G06F 9/449 |
| 2019/0278569 | A1* | 9/2019 | Horton | G06F 8/34 |
| 2020/0050431 | A1* | 2/2020 | Zilouchian Moghaddam | |
| | | | | G06F 8/38 |
| 2020/0150933 | A1* | 5/2020 | Yehuda | G06F 9/44526 |
| 2022/0335031 | A1* | 10/2022 | Eberlein | G06F 16/2365 |
| 2023/0105235 | A1* | 4/2023 | Freund | G06F 8/311 |
| | | | | 717/117 |
| 2024/0004616 | A1* | 1/2024 | Wrighton | G06F 8/315 |
| 2024/0241702 | A1* | 7/2024 | Vembu | G06F 8/41 |

OTHER PUBLICATIONS

Zhang, Haoyuan, Huang Li, and Bruno C. D. S. Oliveira. "Type-safe modular parsing." Proceedings of the 10th ACM SIGPLAN International Conference on Software Language Engineering. 2017.*

Amin, Nada. Dependent Object Types. Diss. EPFL, 2016.*

VanHattum, Alexa, et al. "Verifying dynamic trait objects in Rust." Proceedings of the 44th International Conference on Software Engineering: Software Engineering in Practice. 2022.*

Bi, Xuan, and Bruno C. D. S. Oliveira. "Typed first-class traits." 32nd European Conference on Object-Oriented Programming (ECOOP 2018). Schloss Dagstuhl-Leibniz-Zentrum für Informatik, 2018.*

Vo, Tung Duc. "Application of protocol-oriented programming in iOS development." (2019).*

Nguyen, Ha. "Programming Language interoperability in cross-platform software development." (2022).*

Leuthäuser, Max. "A Pure Embedding of Roles." Technische Universität Dresden.(https://nbn-resolving. org/urn: nbn: de: bsz: 14-qucosa-227624) (2017).*

Barik, Rajkishore, et al. "Optimization of swift protocols." Proceedings of the ACM on Programming Languages 3.OOPSLA (2019).*

Jacobs, Bart "Four Clever Uses of Swift Extensions," cocoacasts.com/four-clever-uses-of-swift-extensions, May 3, 2017 (8 pages).

Johnson, Andrew "Why does Swift not allow stored properties in extensions", stackoverflow.com/questions/32873400/why-does-swift-not-allow-stored-properties-in-extensions, Sep. 30, 2015 (2 pages).

Kasyap, Krishna "How to convert a super class variable into a sub class type in Java," tutorialspoint.com/how-to-convert-a-super-class-variable-into-a-sub-class-type-in-java, Feb. 8, 2021 (3 pages).

Khan, Aasif "Extensions in Swift Explained," appypie.com/swift-extensions-how-to, Dec. 13, 2021 (8 pages).

Liang, "Chapter 11: Inheritance and Polymorphism, from Introduction to Java Programming," 10th Edition, 2015 (49 pages).

Miglani, Gaurav "Referencing Subclass objects with Subclass vs Superclass reference," geeksforgeeks.org/referencing-subclass-objects-subclass-vs-superclass-reference, Mar. 29, 2017 (9 pages).

Sengupta, Tirtharaj "Composition in Golang," geeksforgeeks.org/composition-in-golang, May 1, 2020 (5 pages).

Wikipedia, "Compiler," retrieved from "https://en.wikipedia.org/w/index.phptitle=Compiler oldid=1091156409", last edited on Jun. 2, 2022, at 15:06 (16 pages).

Wikipedia, "Role-Oriented Programming," retrieved from "https://en.wikipedia.org/w/index.phptitle=Role-oriented_programming oldid=1065936286", last edited on Jan. 16, 2022, at 01:48 (3 pages).

Wilder, Noah, "How to make extension for multiple classes Swift," stackoverflow.com/questions/38464134/how-to-make-extension-for-multiple-classes-swift, Mar. 28, 2018 (4 pages).

* cited by examiner

ROLE EXTENSIONS FOR PROGRAMMING LANGUAGES

CROSS REFERENCE TO RELATED APPLICATIONS

This application is related to U.S. Provisional Application 63/370,361 filed 3 Aug. 2022 and Indian Provisional Application 202241035496 filed 21 Jun. 2022, both entitled "Role-Sharing Types and Extensions for Programming Languages," which are incorporated herein by reference.

FIELD OF THE INVENTION

Embodiments of the present disclosure are related, in general, to data types and more particularly, but not exclusively, to a method and compiler for extending data types and elements of data types in programming languages.

BACKGROUND

A computer program is a collection of statements that describes data and instructions for manipulating that data. A statement can declare data of various fundamental types, such as integers, floating-point numbers, characters, and Boolean. Programmers, the authors of computer programs, can also use or create "user-defined data types" that aggregate fundamental data types. For example, a programmer might define data of type "patient" that includes text strings for names and phone numbers, integers for birthdays and weights, and floating-point numbers for test results. Programmer-defined data types include e.g. arrays, structures, unions, enumerations, and classes. Each programming language has its own set of user-defined data types, the "user" here referring to the programmer, that facilitate program creation.

Like others, programmers tend to think of types in terms of roles. The use of role-oriented types can be efficient because types in the same role typically share features, e.g., the intrinsic properties of being a person, an employee, or a student. A person type can thus be used to represent people in their role as a person, while employee and student types can be used to represent people in their roles as employees and students.

Some features overlap between roles, such as a person's age in their roles as person, employee, and student. Such features can be shared by related types by inheritance. For example, with a parent type Person, the properties "name" and "age" can be inherited by child types "employee" and "student." At runtime, a program that instantiates a person object "Rajesh" to represent a real-world person can likewise instantiate a child object of type "employee" that also represents Rajesh, inheriting his name and age from the person object and adding e.g. Rajesh's hiring date, position, and salary. Rajesh can also be represented as a child object of type "Student" that likewise inherits from the person object, extending the person data to include e.g. fields for classes and grades.

Inheritance facilitates the reuse of source code, which can reduce program complexity and simplify program maintenance and extensibility. The converse can also be true. Closely related types can make it difficult to maintain and extend code, as changes to one type may require changes to another, and an overreliance on inheritance can proliferate unnecessary code. Inheritance can also introduce security vulnerabilities. At runtime, when a computer executes a program that instantiates parent and child objects in memory, the child object can inherit more functionality and information than is required by programs with access to the child object.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
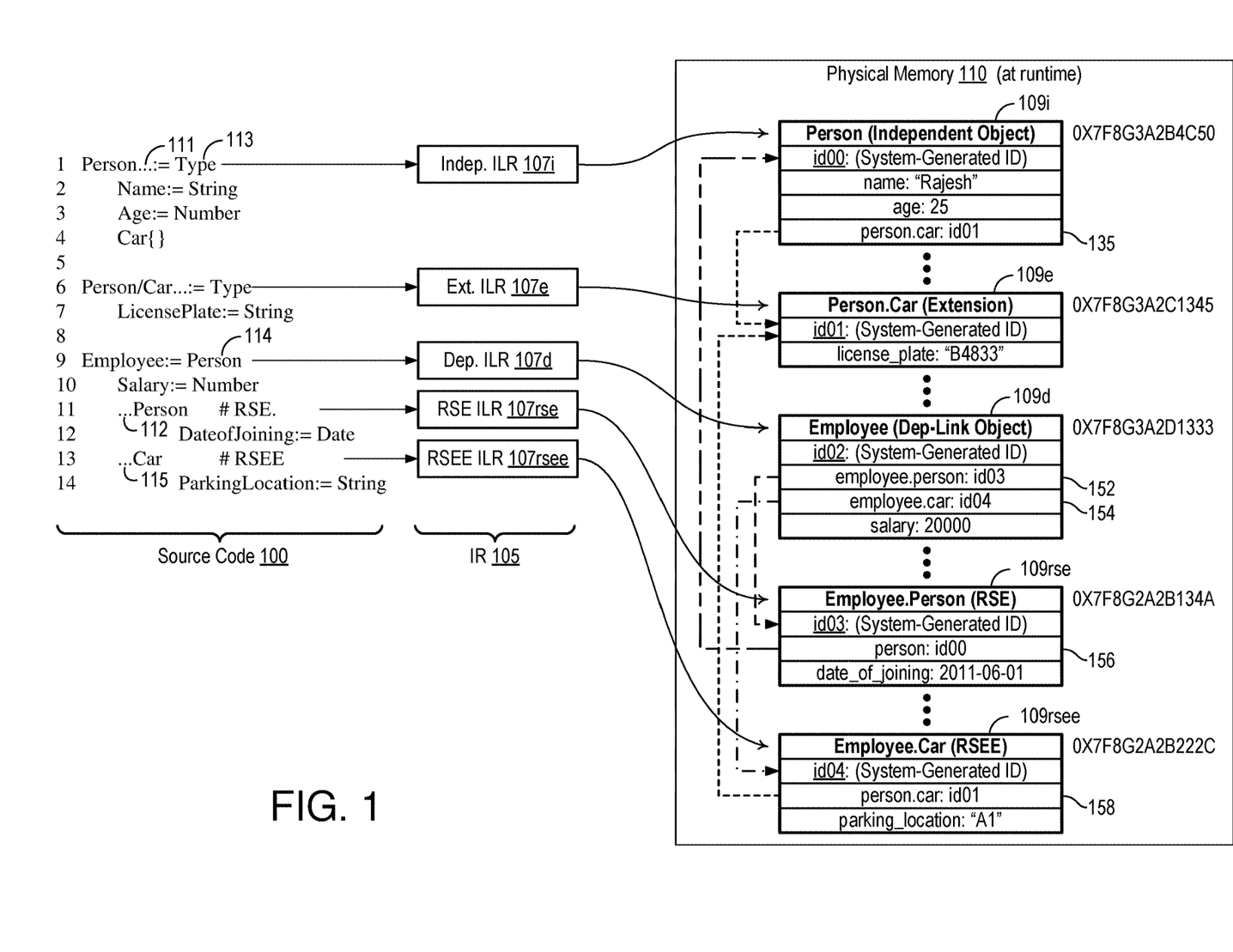
FIG. 1 illustrates how source code 100 written in one embodiment is compiled into an intermediate representation (IR) 105 with an intermediate-language representation 107 for each data type.

A programming language and compiler support inheritance and type extensions in a manner that improves security and simplifies program maintenance and extensibility. FIG. 1 illustrates how source code 100 written in accordance with one embodiment is compiled into an intermediate representation (IR) 105 with an Intermediate-Language Representation (ILR) 107 for each data type. A computer (not shown) executes instructions derived from IR 105 at runtime. In doing so, the computer instantiates related and linked objects 109 in a physical memory 110. Memory-management software, also executing on the computer, finds for each object a free block of memory large enough to store the object. This example uses address ranges marked by a hypothetical hexadecimal starting address for each object 109.

In source code 100, ":=" denotes a type or element declaration and ":" denotes element or object usage. The use of pascal case (PascalCase) for object and element identifiers indicates a declaration and the use of snake case (snake_case) represents object and element usage. The delimiter "#" identifies comments.

Lines 1-4 of source code 100 represents a user-defined independent data type Person (Line 1) that, when compiled, produces an independent intermediate-language representation 107*i* corresponding to independent data type Person. A type identifier 113 defines data type Person as user-defined, and a set of related statements (Lines 2-4) define elements of the data type for a person's Name (Line 2) and age (Line 3).

A third element (Line 4) represents a set of car objects associated with type Person. Intermediate-language representation 107i can be used in producing executable code (for runtime execution) that includes instructions to instantiate an independent object 109i of type Person in memory 110 to represent a specific person. The computer instantiates object 109i in memory 110 by allocating a block of memory and initializing object 109i's fields with appropriate values, in this example a unique independent-object identifier id00 and independent-object variables for a 25-year-old person named Rajesh.

Object 109i includes an object reference 135 to an extension object 109e that extends the scope, or functionality, of independent object 109i to reference car objects. Extension object 109e is defined in Lines 6 and 7 of source code 100 to provide access to a person's license-plate number. Instructions included in executable code produced using the intermediate-language representation 107e of the extension data type Person/Car can instantiate extension object 109e in memory 110. Element car (Line 4) is designated "Car{ }" to represent a set of objects. Extension data type Person/Car (Lines 6 and 7) extends the scope of element Car{ } of type Person to include a sub-element "LicensePlate." This type extension allows programs with access to Person object 109i to likewise access type-extension object 109e, and therefore the person's license plate number. Extension object 109e can be deleted without deleting Person object 109i. Also, extension object 109e can be shared without accessing Person object 109i.

Source code 100 defines a dependent-link data type "Employee" as type Person (Lines 9-14). A type identifier 114 defines data type Employee as user-defined and references independent type Person. The Employee type can be used to represent a person in their role as employee. The Employee type includes a scalar element Salary (Line 10). At runtime, the instructions included in the executable produced using intermediate-language representation 107d can be called upon to instantiate a dependent-link object 109d of type Employee in memory 110 to represent a specific person in their role as employee. Object 109d is termed a "dependent-link object" because it depends upon an independent object for scope and refers to the independent object via one or more references, or "links." Programs with access to role-specific Employee object 109d have access to the scopes of independent Person object 109i and extension object 109e. The sharing of scopes is not symmetrical; access to Person object 109i or extension object 109e does not afford access to Employee object 109d. Employee object 109d can be deleted without deleting Person object 109i.

The statement defining independent Person type (Line 1) includes an extensibility indicator 111, e.g. the suffix " . . . ", that identifies type Person as amenable to role-specific scope extensions. Role-type Employee includes a matching extension indicator 112, the prefix " . . . " in statement " . . . Person" (Line 11), that identifies a role-specific extension of type Person. This type extension is termed a "Role-Scope Extension" (RSE) because it extends the scope of type Person (line 1) accessible in the role of employee. A second extension indicator 115 (Line 13) identifies a role-specific extension of the Car{ } element of type Person. This extension is termed a "Role-Scope Element Extension" (RSEE) because it extends the scope of an element of type Person (line 1) accessible in the role of employee. The term "role extension" refers to both the RSE and RSEE types.

The dependent, role-specific type Employee includes a scalar element Salary (Line 10). RSE " . . . Person" extends the scope of independent type Person (Line 11) to include an additional element "DateofJoining" (Line 12) that is available to dependent-link type Employee, and RSEE " . . . Car" extends the scope of element Car{ } of independent type Person (Line 13) to include an additional sub-element "ParkingLocation" that is also available to dependent-link type Employee. Lines 9-14, when compiled, yield intermediate-language representations 107d, 107rse, and 107rsee. The instructions included in the executable produced using intermediate-language representations 107d, 107rse, and 107rsee can be called upon to instantiate three objects: a dependent-link object 109d representing a person in the role of Employee, an RSE object 109rse extending the scope of type Person accessible via Employee object 109i, and an RSEE object 109rsee extending the scope of an element of type Person accessible via Employee object 109d. Employee object 109d links directly or via another object or objects to objects 109i, 109e, 109rse, and 109rsee so that access to employee object 109d provides access to the other objects, but not vice versa.

Independent object 109i is assigned a unique identifier id00 and, as defined by type Person (Line 1), fields for name, age, and a person.car reference 135 with an identifier id01 assigned to extension object 109e. Extension object 109e includes a field license plate with extension-object value "B4833" representing the license plate of a car registered to person Rajesh.

Employee object 109d is assigned identifier id02 and includes a RSE reference 152 to the unique identifier of RSE object 109rse and an RSEE reference 154 to the unique identifier of RSEE object 109rsee. RSE object 109rse, assigned unique identifier id03, includes a reference 156 to independent object 109i and a field data_of_joining storing the start date for employee Rajesh. Employee object 109d can also include a reference (not shown) to person object 109i, particularly if RSE object 109rse were unavailable to allow dependent-link object 109d access to person object 109i. Finally, RSEE object 109rsee, assigned unique identifier id04, includes a reference 158 to person.car extension object 109e and a field parking_location storing the parking location of the car registered to person Rajesh.

Employee object 109d inherits the scope of Person object 109i and extension object 109e but the reverse is not the case. Employee object 109d and related role extension objects 109rse and 109rsee can thus be modified or deleted without impacting Person object 109i. Other dependent-link objects, such as a student object for Rajesh, that may be linked to and inherit from the same Person object 109i are thus unaffected by changes or deletions to object 109d. This manner of inheritance simplifies type and element extensibility and avoids code proliferation.

Objects are organized in physical memory 110 to improve security. Dependent-link Employee object 109d has access to all the information provided by objects 109i, 109e, 109rse, and 109rsee; whereas independent Person object 109i only has access to extension object 109e. For example, person object 109i has no reference to RSEE employee.car object 109rsee and thus cannot access the field for parking location, so the statement "person.car.parking_location" is invalid and would generate a compile-time error. Object 109rsee has access to the field for parking location, however, so the statement "employee.car.parking_location" is valid. For example, a security guard tasked with parking enforcement may require access to employee parking locations and license-plate numbers. Software provided to the security guard could make calls to RSEE object 109rsee, which provides access to the parking location and, by reference to extension person.car object 109e, the license plate. Objects 109rsee and 109e do not reference any other objects, however, so the security guard is unable to access data beyond what is necessary to perform his or her task. Likewise, someone with access to RSE object 109rse could have access to Rajesh's date of joining, name, age, and license plate without having access to Rajesh's salary.

Extending data types and data-type elements in the illustrated manner to instantiate referenced objects reduces program complexity and simplifies maintenance and extensibility. In this example, information relating to a person's car can easily be extended to include e.g. color by adding an element CarColor:=String. Unnecessary information can be deleted too. Unneeded dependent-link and role extension objects can be deleted from memory 110 without interfering with other objects. Also advantageous, intermediate-language representations compiled in the manner detailed above easily map to relational databases. Relational databases are used to store large amounts of data and are commonly used in web applications. Objects can represent records in a relational database, each record being a collection of related data stored in a single row of a table. The executable code includes instructions (e.g. machine code) produced using IR 105 in this example.

Role-scope and role-scope element extensions can be generalized from roles to parts, species, or subsets. For example, an independent data object "Hospital" can share e.g. an address field with dependent-link objects representing different parts of the hospital, e.g. a dependent-link object "EmergencyRoom" of type Hospital. The Hospital data type can be extensible to allow the EmergencyRoom type to extend the scope of "Hospital." Likewise, an independent data object "Product" can share a product number with dependent-link species objects defining instances of the product type and including e.g. a product serial number, pricing information, and contact information for a purchaser. An independent data object "Vehicle" representing members of the vehicle class of goods can share registration information with dependent-link objects "Truck" representing members of a subset of the vehicle class. In each case, the independent type or object can exist without the dependent-link type of object.

Overview of Compiler

Source code 100 is an embodiment of a programming-language construct that can be compiled to produce lower-level code that instantiates objects as detailed above. A compiler is a program that translates source code into machine code that can be executed by a computer. Some languages are not compiled but are rather interpreted. Interpretation differs from compilation in that the interpreter executes programs directly. Interpreted languages can be used to instantiate objects of the types detailed in FIG. 1. However, the following discussion focuses on compilers.

Program execution takes place on computer hardware in a runtime environment. The computer hardware comprises processors, memory, and storage. The runtime environment is a set of software tools and resources that runs on the computer hardware to execute a program. The runtime environment includes the operating system, libraries, and other components that are necessary for the program to run. Computer hardware and runtime environments are well known to those of skill in the art, so a detailed discussion is omitted.

Figure 2A:
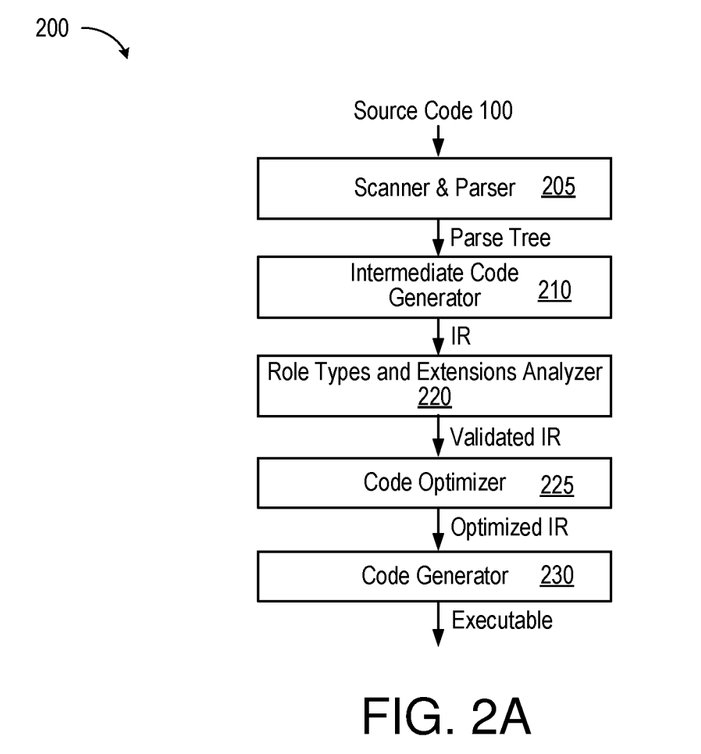
FIG. 2A is a flowchart 200 illustrating how a compiler enforces rules for creating and linking objects at compile time.

FIG. 2A is a flowchart 200 illustrating how a compiler enforces rules for creating and linking objects at compile time. Initially, the compiler scans and parses the source code (205) to generate a parse tree. The generated parse tree is then fed to an intermediate code generator (210) from which an Intermediate Representation (IR) of the source code is obtained. This IR passes through a role types and extensions analyzer (220) to provide a validated IR. After validation, a code optimizer (225) produces an optimized IR from the validated IR for better performance. A code generator (230) then creates an executable, or executable code, specific to a target processor.

The example of FIG. 1 focuses on source code 100 because source code is generally easier to read than intermediate representations and machine code. Source code is written in a high-level programming language, which is designed to be easy to read and understand. Intermediate representations and machine code are written in more compact and efficient lower-level languages. The methods detailed herein can be applied to the source code or at lower levels.

Figure 2B:
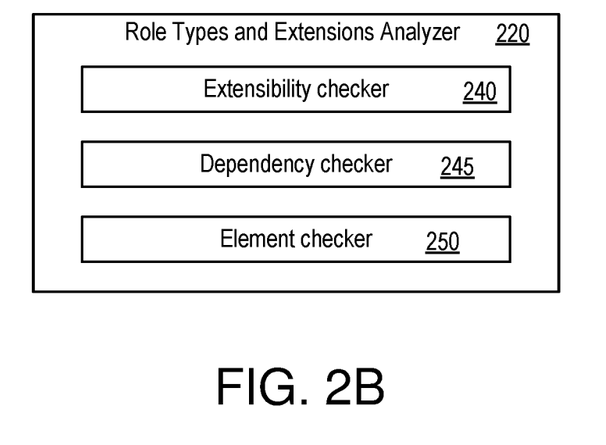
FIG. 2B depicts role types and extension analyzer 220 of FIG. 2A in accordance with one embodiment.

FIG. 2B depicts role types and extension analyzer 220 of FIG. 2A in accordance with one embodiment. Analyzer 220 semantically validates RSEs and RSEEs in source code 100 using an extensibility checker 240, a dependency checker 245, and an element checker 250. The functions of these checkers are detailed below.

Figure 3:
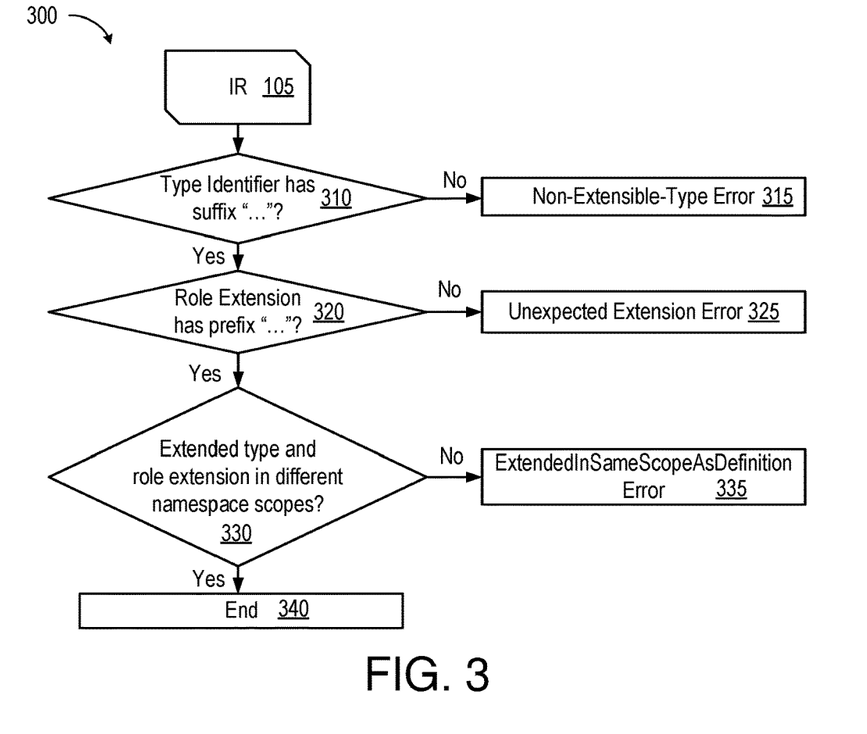
FIG. 3 is a flowchart 300 illustrating the functions of extensibility checker 240 of FIG. 2B.

FIG. 3 is a flowchart 300 illustrating the functions of extensibility checker 240 of FIG. 2B. The functions are performed on IR 105 or a lower-level code. The presence of " . . . " as the suffix to a type identifier indicates that the type can be extended (310). Per decision 310, attempts to extend a non-extensible type produces an error 315. Likewise, per decision 320, a role extension that lacks a prefix " . . . " generates an error (325). For example, "Person . . . " in Line 1 and "Person/Car . . . " in Line 6 are appended with " . . . " in their suffix to represent their extensibility. Also, " . . . Person" in Line 11 and " . . . Car" in Line 13 are appended with " . . . " in their prefix to represent their role extensions.

The type definition of an extended data type and a role extension should not be in the same scope. For example, role extension ' . . . Person' in Line 11 of source code 100 should not be an element of the type definition of 'Person . . . " in Lines 1-4. Another example is where the role extension " . . . Person" should not occur in Line 5 of source code 100 which is in the same scope where the "Person" data type is defined. The process therefore determines whether a role extension of an independent data type is within the same scope as the independent data type (decision 330). The compiler issues an error (335) if the two are in the same scope.

Figure 4:
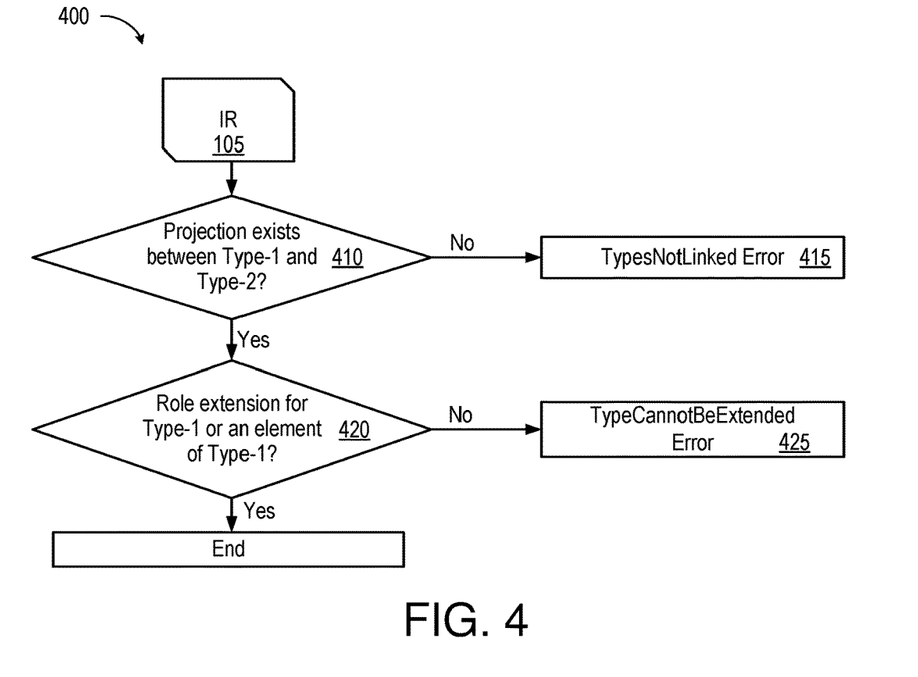
FIG. 4 is a flowchart 400 illustrating the functions of dependency checker 245 of FIG. 2B.

FIG. 4 is a flowchart 400 illustrating the functions of dependency checker 245 of FIG. 2B. In decision 410, the compiler checks whether a role-sharing relationship introduces a projection between two types namely, Type-1 and Type-2 where Type-1 is the type that is to be extended and Type-2 the type in which one or more role extensions are defined. A first level of projection is established through role-sharing between Type-1 and Type-2. If the first level of projection does not exist, then a "TypesNotLinked" error is reported by the compiler (415). A second level of projection is based on the accessibility of all the elements within Type-1 by Type-2. This second level of projection happens if the first level of projection is satisfied. Per decision 420, if a defined role extension is not for Type-1 or an element of Type-1, then the compiler throws a "TypeCannotBeExtended" error (425). An RSEE can exist without an RSE.

Figure 5:
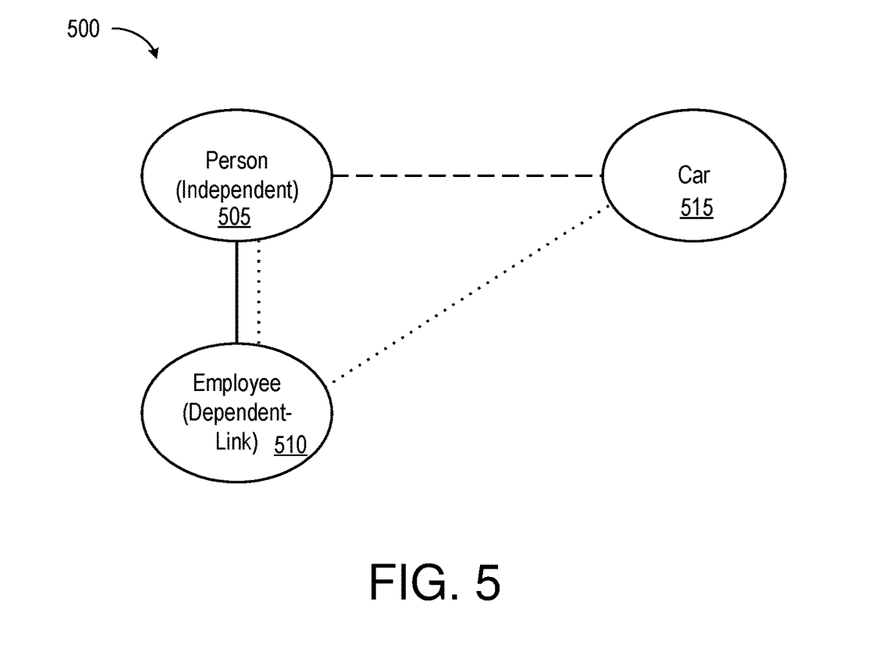
FIG. 5 is a diagram 500 illustrating two levels of dependency type projections in source code 100 of FIG. 1.

FIG. 5 is a diagram 500 illustrating two levels of dependency type projections in source code 100 of FIG. 1. "Person" (Line 1), "Employee:=Person" (Line 9), and "Car{ }" (Line 4) are illustrated as respective nodes 505, 510, and 515 in role-sharing relationships. These relationships establish a first level of projection from "Employee" to "Person" and a second level of projection from "Employee" to "Car{ }". The first level of projection between "Person" and "Employee" is represented using a solid line showing they behave as independent and dependent-link types, respectively. The independent type has "Car{ }" as its element (represented as a dashed line). The second level of projection between "Employee" and "Car{ }" is established through "Person". Both Person and Car are projected from "Employee." Functionally, this means that employee objects have access to both person and car objects. The projections from Employee to Person and Car can be thought of as inside "Employee" (represented as dotted lines).

Figure 6:
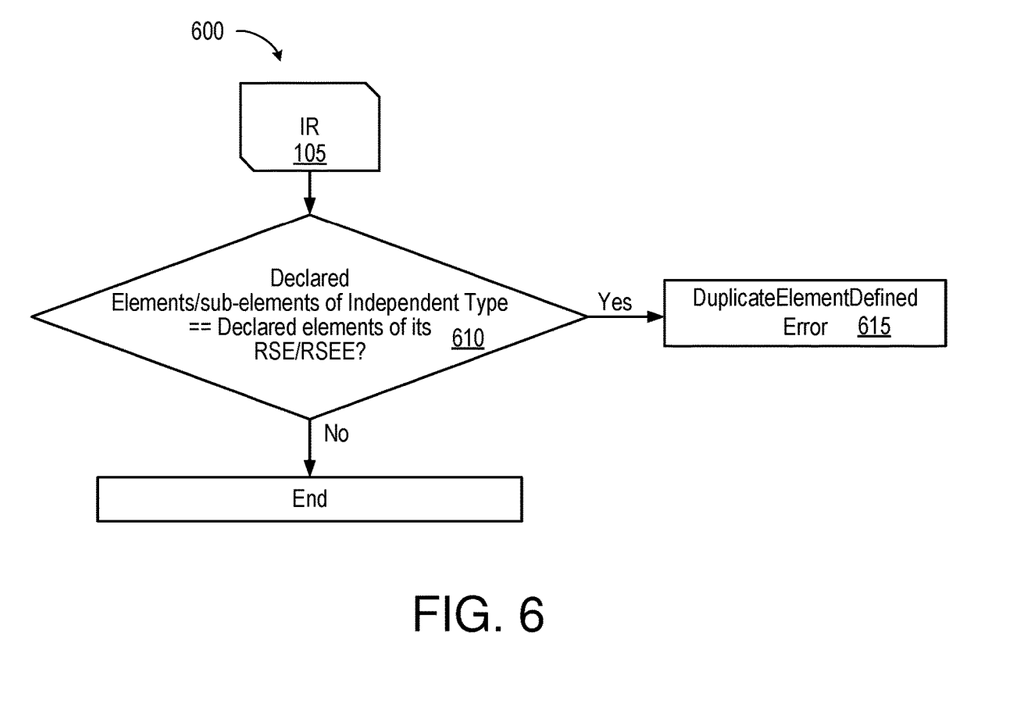
FIG. 6 is a diagram 600 flowchart depicting an embodiment of element check 250 of FIG. 2B.

FIG. 6 is a flowchart 600 depicting an embodiment of element check 250 of FIG. 2B. Per decision 610, the compiler verifies whether declared elements and sub-elements of an independent type differ from those of any RSE or RSEE that extends the scope of the independent type. If this check fails, the compiler throws an error "DuplicateElementDefined" (615). This check ensures that the functionality of a type is not contradicted by role extensions.

Consider the new definition of dependent-link type "Employee" in the following example, a snippet of source code that extends source code 100 of FIG. 1. The "Age" in Line 3 of source code 100 is a scalar element of independent type "Person". The re-declaration of the same element "Age" in a role-scope extension at Line 23, below, throws an error. The re-declaration of "LicensePlate" in a role-scope element extension at Line 25 likewise throws an error as part of the element check.

21 Employee:=Person
22 . . . Person
23 Age:=Number #Re-declaration of "Age", which throws an error.
24 . . . Car
25 LicensePlate:=String #Re-declaration of "LicensePlate", which throws an error.

Memory Management

As illustrated in FIG. 1, objects for independent data types are maintained separate from objects for dependent-link data types. An independent object may be created and exist prior to the creation of an associated dependent-link object. In some embodiments, creation of a dependent-link object absent an associated independent object automatically creates the associated independent object. Memory management for dependent-link and independent objects can be handled separately.

(A) Memory Management for Role-Sharing

The following code snippet depicts a role-sharing relationship between independent type 'Person' and dependent-link type 'Employee' and shows how a programming language or compiler can prevent the creation of dependent-link objects absent an associated independent object.

1 Person:=Type
2 Name:=String
3 Age:=Number
4
5 Employee:=Person
6 Salary:=Number In this example, "Person" is of the independent type and "Employee" the dependent-link type. The following lines of code show the object creation for "Person" and "Employee" types in one embodiment. The creation of an "Employee" object requires the creation of a "Person" object in this example because the dependent-link object "Employee" is of type "Person". Object creation can be done by: (1) creating a dependent-link object with a nested independent object, or (2) creating a dependent-link object linked to an existing independent object. An exemplary nested creation statement for employee Rajesh of FIG. 1 is as follows:

RajeshEmployee<-create('Employee', person: ('Person', name: "Rajesh", age: 25), salary: 20000).

Figure 7A:
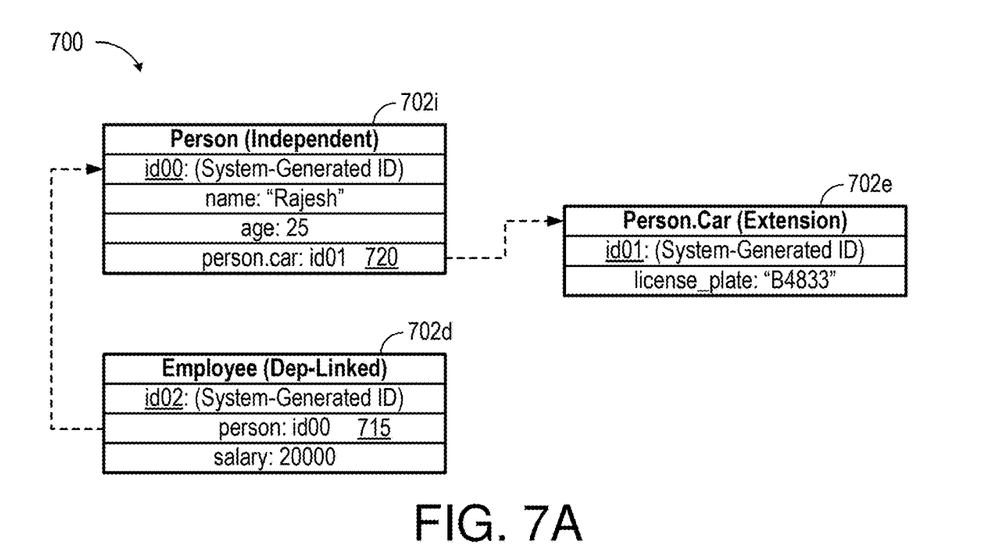
FIG. 7A is a memory diagram 700 illustrating a role-sharing relationship between an independent object 702*i* and a dependent-link object 702*d*.

In the nested creation case, the independent object and the dependent-link object are created using a single creation statement. In addition to the static assignment of data values in the example create statement shown above, the data for a create statement can also be received at runtime. In FIG. 7A, the independent object 702i is created, followed by the creation of dependent-link object 702d. In this context, a "creation statement," declares an identifier with an associated object or objects. In this example, a single creation statement with identifier "RajeshEmployee", when compiled, produces instructions for instantiating two objects in memory. One of the instructions instantiates an independent-data object Person, while another instruction instantiates a dependent-link object Employee with a reference to the independent object.

FIG. 7A is a memory diagram 700 showing the memory allocation of an independent object 702i and a dependent-link object 702d that can be instantiated in memory responsive to the single creation statement noted above. An extension object 702e can be similarly created using a nested or separate creation statement. In creating dependent-link object 702d, memory for the independent object 702i is allocated separately. Car object 702e, an extension of independent person object 702i, can also be accessed by dependent-link "Employee" object 702d by a second level of projection.

Linked independent and dependent-link objects can be created using separate creation statements. Creation statements linking a dependent-link object for employee Rajesh with an existing independent object might be:

RajeshPerson<-create('Person', name: "Rajesh", age: 25).
RajeshEmployee<-create('Employee', person: rajesh_person, salary: 20000).

In FIG. 7A, independent object 702i with identifier id00 can be created responsive to the creation statement RajeshPerson, after which dependent-link object 702d can be created responsive to the creation statement RajeshEmployee and with a link 715 to the existing independent object. Car object 702e, an extension of independent person object 702i, can also be accessed by dependent-link "Employee" object 702d by a second level of projection. In addition to the static assignment of data values in the example create statements shown above, the data for the create statement can also be received at runtime.

The foregoing statements use "<-" to create and append objects. Both methods result in the same memory structures in these examples. In the example of FIG. 1, objects 109 are assigned unique, system-generated IDs to establish links between objects that facilitate inter-object access and object restrictions. Object linking also facilitates the addition, extension, and deletion of dependent-link objects.

(B) Memory Management for Role Extensions

The description below is with reference to the example of FIG. 1. An object "rajesh_employee" is created for dependent-link type "Employee" (with nested independent object "Person") with its RSE property "date_of_joining":

rajesh_employee<-create('Employee', person: ('Person', name: "Rajesh", age: 25, date_of_joining: 2011-06-01), salary: 20000)

The "date_of_joining" is an RSE property of independent type "Person", defined inside dependent-link type "Employee". The "parking_location" is an RSEE property of extension type "Person.Car" and is assigned while creating RSEE object 109rsee with reference 158 to extension object 109*e*. In addition to the static assignment of data values in the example create statement shown above, the data for a create statement can also be received at runtime. The following statement instantiates an independent object 109*i*, extension object 109*e*, dependent-link object 109*d*, and RSEE object 109rsee.

rajesh_employee_Car<-append(rajesh_employee_car{ }, create('Car', LicensePlate: "4833", ParkingLocation: "A1"))

Figure 7B:
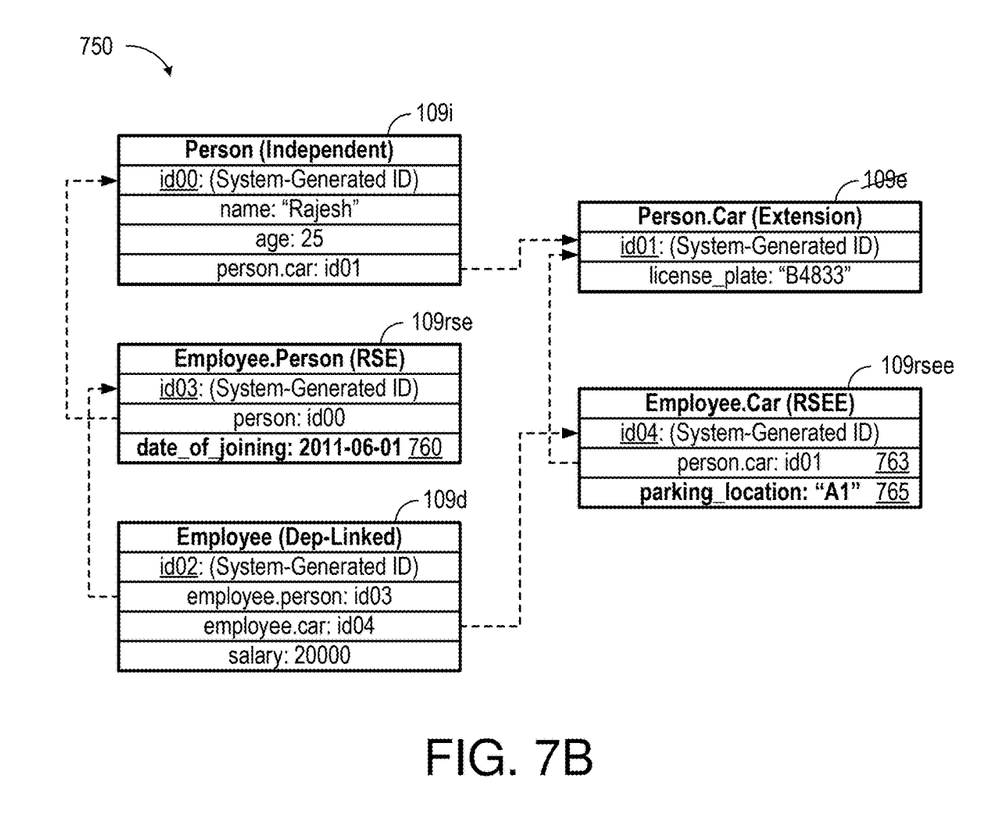
FIG. 7B is a memory diagram 750 showing the memory allocation of RSE and RSEE extensions using an example from FIG. 1.

FIG. 7B is a memory diagram 750 showing the memory allocation of RSE and RSEE extensions using the runtime example of memory 110 of FIG. 1. In addition to the static assignment of data values in the example append statement shown above, the data for an append statement can also be received at runtime. During the creation of a dependent-link object 109*d*, the compiler creates an RSE object 109rse and an RSEE object 109rsee In this case, a separate memory is allocated for role-extension objects 109rse and 109rsee. The memory space for object 109rse is allocated a unique ID id03 and contains RSE property "DateofJoining" 760. Similarly, the memory for RSEE object 109rsee of a member car belonging to the collection of cars "Car { }" is allocated separately as "Employee.Car" with unique ID (id04), a reference 763 to extension object 109*e*, and an RSEE property (ParkingLocation) 765. The memory spaces allocated to RSE object 109rse and RSEE object 109rsee are separate, and independent object 109*i* and extension object 109*e* have no access to them. Therefore, "person.date_of_joining" and "person.car.parking_location" are invalid and result in a compilation error when they occur in program source code. The compile-time error message for this aspect is "Role extension access not possible as a member of independent type".

The memory spaces for "Employee.Person" and "Employee.Car" are allocated separately with unique IDs. "Car" object 109rsee can be deleted without deleting "Person.Car" and "Employee" objects 109*e* and 109*d*. One or more car members belonging to the collection of cars represented by "Car { }" of Person Object 109*e* could be deleted, which deletes the corresponding RSEE objects (e.g. RSEE object 109rsee), while "Employee.Person" object 109rse can continue to exist.

Independent and Dependent-Link Object Management

An independent object is maintained independently of an associated dependent-link object and may even exist prior to the creation of the dependent-link object. This independent maintenance of objects supports use cases like creating a new dependent-link object from the existing independent object without cloning. During the creation of a dependent-link object, the associated independent object is verified for its existence by an event handler written by the developer for the application. This event handler uses a unique element of the independent type for verification. If the independent object exists, the dependent-link object is linked with it. Otherwise, both dependent-link and independent objects are created newly as separate entities.

In the example of FIG. 7A, if the dependent-link object (rajesh_employee) is deleted, independent object 702*i* and extension object 702*e* can be retained. With respect to the example of FIG. 7B, when dependent-link object 755*d* (rajesh_employee) is deleted, its corresponding RSE object 755rse (employee.person) and RSEE object 755rsee (employee.car) are also deleted. The independent object 755*i* is retained and its existence can be verified for future use. When any other dependent-link object needs this retained independent object, the independent object can be searched in memory and can be linked with the new dependent-link object. When an independent object is deleted, its corresponding extension objects and dependent-link objects are also deleted. Similarly, the deletion of an object extending an element of an independent type can delete a linked RSEE object.

Advantages of Role-Scope Extensions

This section describes the following advantages of using role extensions (RSE and RSEE):

Efficient handling of the role-dependency of data;
Restricted access to RSE/RSEE elements;
Implicit object tracing through role sharing; and
Secure access to private elements.

(A) Role-Dependency of Data

In a data scheme where at least one data element of an independent type depends on its specific role (dependent-link type), RSEE data structures allow programmers to capture such a role-dependency of data and efficiently handle related processing arising from the requirements of the software application at hand. The role-dependency of data using RSEE objects is explained with the help of the example of FIG. 1. The member car belonging to the collection of cars "Car{ }" of "Person" type acquires or gets a "ParkingLocation" for its specific role, which is "Employee" type.

To achieve such role-dependency of data, an RSEE data structure is defined with "ParkingLocation" as its RSEE property, which is shown in Lines 13 and 14 of source code 100. In role-dependency of data, the object of an element of a dependent-link type alone can access the RSEE property. An access to the RSEE property is forbidden for the extension object since the property belongs to the dependent-link type. Hence, person object 109*i*, which is not an employee, cannot access the "ParkingLocation" in RSEE object 109rsee. In other words, a person object gets a "ParkingLocation" only when the "Person" is an "Employee". The compiler therefore performs a restriction check that ensures "person.car.parking_location" is invalid and "employee.car.parking_location" is valid.

(B) Restricted Access to RSE/RSEE Elements

A compile-time validation restricts an object of an independent type and an object of an element of an independent type associated with a dependent-link object from accessing the elements of any corresponding RSE or RSEE objects. The compiler throws an error with a message "RSE/RSEE access not possible as a member of an independent type or element of an independent type" when an independent type or type extension tries to access an RSE or RSEE element directly. For example, "person.date_of_joining" or "person.car.parking_location" in source code 100 of FIG. 1 throws an error in view of this restriction.

Further, in a role-sharing relation, the compiler disallows the type casting of independent types into dependent-link types to prevent independent objects from accessing RSE/RSEE objects. For example, "e=(Employee) p", "=" being an assignment operator, is a typecasting expression seeking to convert an element of type "p" (for "Person") to an element of type "Employee". If permitted, this type casting could produce an independent "Person" object with access to RSE/RSEE objects meant to be restricted to an "Employee" object. The compiler thus issues the compilation error "Type casting from independent type to dependent-link type not allowed." However, type casting of a dependent-link type to an independent type, e.g. "p=(Person) e", is allowed and can be done by the compiler through implicit object tracing. This casting can also be performed implicitly as "p=e" by the compiler.

The compiler also reports an error when an independent object is being checked as an instance of its respective dependent-link type using a function "is?( )". The function "is?( )" checks whether an object is an instance of a particular dependent-link type and returns a Boolean value. For example, the statement "el.is?(person)" returns a Boolean value TRUE. However, the statement "pl.is?(employee)" will result in a compilation error rather than returning a Boolean value. This compile-time check is referred to as "Instance-of Restriction Check", which throws an error message saying that "Validation of an independent object as an instance of dependent-link type not allowed".

The instance-of restriction check is explained through an expression in the following source-code snippet. In general, an expression is a code block used to perform a simple computation that does not involve multiple iterations. The parameter block represents the input to the expression and the return block represents the output of the expression that is to be returned.

```
1    AccessDOJ:= Expression
2        parameter
3            P1: person
4        return
5            if(p1.is?(employee)) # "p1.is?(employee)" is invalid due to
             Instance-of Restriction Check
6                p1.date_of_joining
```

At Line 1, an expression named "AccessDOJ" is declared to exist. This expression expects an independent object "Person" as its parameter. The proposed instance-of restriction check considers the statement in Line 5 "pl.is?(employee)" as invalid after verifying whether the person object (P1) is an instance of "employee" type and reports a compile-time error. In Line 6, the validation prevents the person object from accessing the RSE element (date_of_joining), which is only specific for the employee object. Similarly, the restriction to RSEE elements is also applicable for extension object.

(C) Implicit Object Tracing

Role-sharing allows the dependent-link type to project its independent role through implicit object tracing. This object tracing is leveraged when there are functions or expressions that expect an independent object, but only a dependent-link object is available. Consider the "GetAge" expression in Line 1 of the following source-code snippet, where a "Person" object is given as an input parameter (Lines 2 and 3). This expression returns the age of the person as its output, as seen in Lines 4 and 5.

```
1    GetAge:= Expression
2        parameter
3            Input: person
4        return
5            input.age
```

When the "GetAge" expression of Line 1 is invoked with an employee object, the compiler traces the "employee.person" role out of it because "get_age(rajesh_employee)" is equivalent to "get_age(rajesh_employee.person)" and "get_age(rajesh_person)". The compiler implicitly converts "employee" to "employee.person" when a "person" parameter is required without the developer's intervention. This implicit conversion is a syntactic sugar that allows writing code like "employee.name" rather than "employee.person.name" for accessing the elements of "Person" type. Implicit object tracing in multi-level role-sharing reduces the length of a query for indirection to access the elements of an independent object by a dependent-link object.

The implicit tracing of an independent object from a dependent-link object occurs when the dependent-link object is used as an input parameter in a function or expression. In the following example, a "GetDOJ" expression in Line 1 needs an "employee.person" object as the input parameter (Lines 2 and 3). This expression returns the date of joining (date_of_joining) of an employee as seen in Lines 4 and 5.

```
1    GetDOJ:= Expression
2        parameter
3            Input: employee.person
4        return
5            input.date_of_joining
```

When an employee object is passed to that expression as "get_doj(rajesh_employee)", the compiler implicitly traces the "employee.person" from the "employee" object. When the same expression is invoked with a person object as "get_doj(rajesh_person)", the compiler will reject the expression due to the insufficient information that "rajesh_person" is the object linked or created with "rajesh_employee".

(D) Secured Access to Dependent-link Elements

The RSE/RSEE language construct assures privacy and security to the dependent-link-specific elements using an implicit object instead of a dependent-link object wherever necessary. This restricted access to private elements of dependent-link objects protects privacy and guards against bias. Consider the following example in which "Employee" is an independent type (Line 1). Elements "EName" and "ContactInfo { }" of independent type Employee are shown in Lines 2 and 3. Element "ContactInfo{ }" is defined in Line 5 with a sub-element "Mobile" in Line 6. In Line 8, "PermanentEmployee" is defined as a dependent-link type with a private element "AnnualIncrement" in Line 9. The "Employee" is extended in Line 11 with an RSE property "MachineNumber" and "ContactInfo" is extended in Line 12 with an RSEE property "OfficeExtension" in Line 13.

```
1    Employee...:= Type
2        EName:= String
```

```
3       ContactInfo{ }
4
5    Employee/ContactInfo...:= Type
6       Mobile:= Number
7
8    PermanentEmployee:= Employee
9       AnnualIncrement:= Number # Private Element
10      ...Employee
11         MachineNumber:= String
12      ...ContactInfo
13         OfficeExtension:= Number
14
15   MachineVerification:= Expression
16      parameter
17         Input1: permanent_employee.employee # dependent-link.independent object
18      return
19         input1.machine_number
20         # Cannot access "input1.annual_increment" here
21
22   ReachToStaff:= Expression
23      parameter
24         Input2: permanent_employee.contact_info # dependent-link.extension object
25      return
26         input2.office_extension
27         # Cannot access "input2.annual_increment" here
```

In Lines 15 to 20, a "MachineVerification" expression uses a "permanent_employee.employee" object instead of an "employee" object as its input parameter. Assume when a system administrator invokes a "MachineVerification" expression, only the "MachineNumber" (Line 19) is accessible. The element for "AnnualIncrement" of "PermanentEmployee" (Line 9) is restricted (Line 20). Similarly, using an RSEE object instead of a dependent-link object limits the access to dependent-link-object-specific elements. Lines 22 to 27 show a "ReachToStaff" expression that uses a "permanent_employee.contact_info" object instead of the "employee" object as its input parameter. Assume when an office administrator invokes the "ReachToStaff" expression, only the "OfficeExtension" is allowed access (Line 26) and the "AnnualIncrement" of "PermanentEmployee" is restricted (Line 27).

Figure 8:
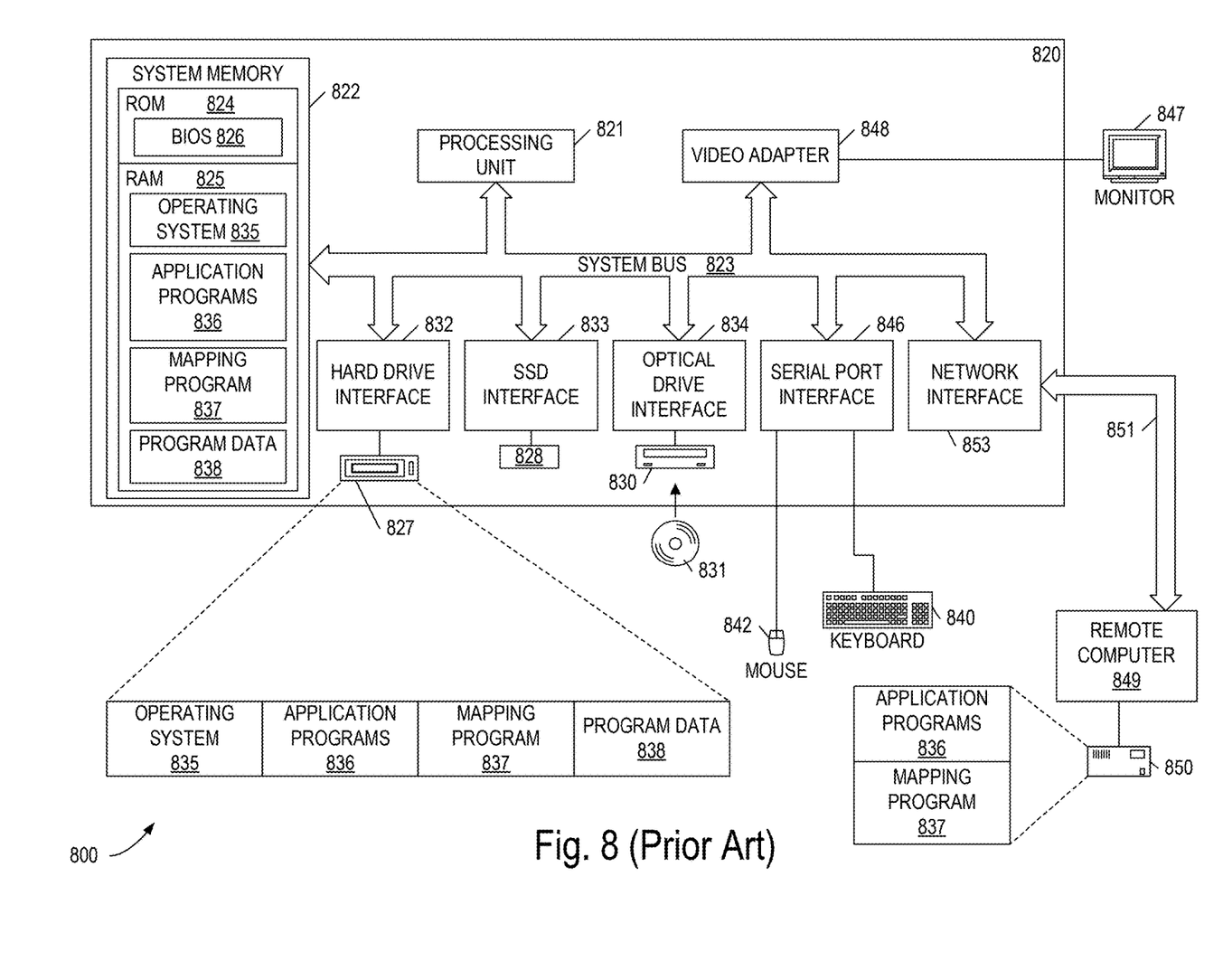
FIG. 8 (prior art) depicts a general-purpose computing system 800 that can serve as a client or a server depending on the program modules and components included.

FIG. 8 (prior art) depicts a general-purpose computing system 800 that can serve as a client or a server depending on the program modules and components included. One or more computers of the type depicted in computing system 800 can be configured to perform operations described with respect to FIG. 1-7. Those of skill in the art will appreciate that the invention may be practiced using other system configurations, including hand-held devices, multiprocessor systems, microprocessor-based or programmable consumer electronics, network PCs, minicomputers, mainframe computers, and the like.

Computing system 800 includes a conventional computer 820, including a processing unit 821, a system memory 822, and a system bus 823 that couples various system components including the system memory to the processing unit 821. The system bus 823 may be any of several types of bus structures, including a memory bus or memory controller, a peripheral bus, and a local bus using any of a variety of bus architectures. The system memory includes read only memory (ROM) 824 and random-access memory (RAM) 825. A basic input/output system 826 (BIOS), containing the basic routines that help to transfer information between elements within the computer 820, such as during start-up, is stored in ROM 824. The computer 820 further includes a hard disk drive 827 for reading from and writing to a hard disk, not shown, a solid-state drive 828 (e.g. NAND flash memory), and an optical disk drive 830 for reading from or writing to an optical disk 831 (e.g., a CD or DVD). The hard disk drive 827 and optical disk drive 830 are connected to the system bus 823 by a hard disk drive interface 832 and an optical drive interface 834, respectively. The drives and their associated computer-readable media provide nonvolatile storage of computer readable instructions, data structures, program modules and other data for computer 820. Other types of computer-readable media can be used.

Program modules are stored on non-transitory, computer-readable media such as disk drive 827, solid state disk 828, optical disk 831, ROM 824, and RAM 825. The program modules include an operating system 835, one or more application programs 836, other program modules 837, and program data 838. An application program 836 can used other elements that reside in system memory 822 to perform the processes detailed above.

A user may enter commands and information into the computer 820 through input devices such as a keyboard 840 and pointing device 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port, universal serial bus (USB), or various wireless options. A monitor 847 or other type of display device is also connected to the system bus 823 via an interface, such as a video adapter 848. In addition to the monitor, computers can include or be connected to other peripheral devices (not shown), such as speakers and printers.

The computer 820 may operate in a networked environment using logical connections to one or more remote computers, such as a remote computer 849. The remote computer 849 may be another computer, a server, a router, a network PC, a peer device, or other common network node, and typically includes many or all the elements described above relative to the computer 820, although only a memory storage device 850 has been illustrated in FIG. 8 to show support for e.g. the databases noted above in connection with FIGS. 1-6. The logical connections depicted in FIG. 8 include a network connection 851, which can support a local area network (LAN) and/or a wide area network (WAN). Such networking environments are commonplace in offices, enterprise-wide computer networks, intranets, and the Internet.

Computer 820 includes a network interface 853 to communicate with remote computer 849 via network connection 851. In a networked environment, program modules depicted relative to the computer 820, or portions thereof, may be stored in the remote memory storage device. It will be appreciated that the network connections shown are exemplary and other means of establishing a communication link between the computers may be used.

The foregoing description of the implementations of the present techniques and technologies has been presented for the purposes of illustration and description. This description is not intended to be exhaustive or to limit the present techniques and technologies to the precise form disclosed. Many modifications and variations are possible in light of the above teaching. It is intended that the scope of the present techniques and technologies are not limited by this detailed description. The present techniques and technologies may be embodied in other specific forms without departing from the spirit or essential characteristics thereof. The modules, routines, features, attributes, methodologies, and other aspects of the present disclosure can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, and not limiting. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method of parsing statements of programming code, the method comprising:
   parsing a first of the statements naming a first data type, the first data type having:
      a first-data-type name;
      an extensibility indicator indicating the first data type is extensible; and
      a first-data-type element;
   parsing a second of the statements naming a second data type referencing the first data type, the second data type having:
      a second-data-type element associated with an extension indicator, the second-data-type element referencing at least one of the first data type and the first-data-type element;
   creating, responsive to the first data type, a first intermediate-language representation corresponding to the first data type;
   creating, for the first-data-type element, a second intermediate-language representation corresponding to the first-data-type element; and
   creating, responsive to the second data type:
      a third intermediate-language representation corresponding to the second data type; and
      a fourth intermediate-language representation with a reference to the second intermediate-language representation;
      the third intermediate-language representation including a reference to the fourth intermediate-language representation.

2. The method of claim 1, wherein the extensibility indicator matches the extension indicator.

3. The method of claim 1, wherein the first-data-type element has a scope and the second-data-type element references the first-data-type element and extends the scope of the first-data-type element.

4. The method of claim 1, wherein the first-data-type element has a first-data-type-element name and an extension indicator associated with the second-data-type element is followed by the first-data-type-element name.

5. The method of claim 1, further comprising:
   parsing a third of the statements including an access of the second-data-type element from the first data type and issuing an error message responsive to the access of the second-data-type element from the first data type.

6. A method of parsing statements of programming code, the method comprising:
   parsing a first of the statements naming a first data type, the first data type having:
      a first-data-type name;
      an extensibility indicator indicating the first data type is extensible; and
      a first-data-type element;
   parsing a second of the statements naming a second data type referencing the first data type, the second data type having:
      a second-data-type element associated with an extension indicator, the second-data-type element referencing at least one of the first data type and the first-data-type element;
   creating, responsive to the first data type, a first intermediate-language representation corresponding to the first data type; and
   creating, responsive to the second data type:
      a second intermediate-language representation corresponding to the second data type; and
      a third intermediate-language representation including a reference to the first intermediate-language representation;
      the second intermediate-language representation including a reference to the third intermediate-language representation.

7. The method of claim 6, wherein the first data type has a scope and the second-data-type element references the first data type and extends the scope of the first data type.

8. The method of claim 6, wherein the extension indicator associated with the second-data-type element is followed by the first-data-type name.

9. The method of claim 6, further comprising:
   parsing a third of the statements including an access of the second data type from the first data type and issuing an error message responsive to the access of the second data type from the first data type.

10. The method of claim 6, wherein the second data type includes an other element independent of the extension indicator, the method further comprising:
parsing a third of the statements including an access of the other element from the first data type; and
issuing an error message responsive to the access of the other element from the first data type.

11. The method of claim 6, wherein the second data type includes an other element independent of the extension indicator, the method further comprising:
parsing a third of the statements including an access of the other element from second-data-type element with the extension indicator; and
issuing an error message responsive to the access of the other element from the second data-type element.

12. The method of claim 6, further comprising:
parsing a third of the statements including a type casting of the first data type to the second data type and issuing an error message responsive to the type casting.

13. The method of claim 6, further comprising:
parsing a third of the statements including a check whether an instance of the first data type is of the second data type and issuing an error message responsive to the check.

14. The method of claim 6, wherein the extensibility indicator matches the extension indicator.

15. The method of claim 6, further comprising:
parsing a third of the statements including an access of the second-data-type element from the first data type and issuing an error message responsive to the access of the second-data-type element from the first data type.

16. A system comprising:
at least one processor;
a memory connected to the at least one processor; and
a compiler that when loaded into the at least one processor causes the at least one processor to:
parse first statements of programming code naming a first data type, the first data type having:
a first-data-type name;
an extensibility indicator indicating the first data type is extensible; and
a first-data-type element; and
parse second statements of the programming code, the second statements naming a second data type referencing the first data type, the second data type having:
a second-data-type element associated with an extension indicator, the second-data-type element referencing at least one of the first data type and the first-data-type element;
wherein the compiler further causes the at least one processor to:
create, responsive to the first data type, a first intermediate-language representation corresponding to the first data type; and
create, responsive to the second data type:
a second intermediate-language representation corresponding to the second data type; and
a third intermediate-language representation including a reference to the first intermediate-language representation;
the second intermediate-language representation including a reference to the third intermediate-language representation.

17. The system of claim 16, wherein the compiler further causes the at least one processor to parse a third of the statements including a type casting of the first data type to the second data type and issuing an error message responsive to the type casting.

18. A system comprising:
at least one processor;
a memory connected to the at least one processor; and
a compiler that when loaded into the at least one processor causes the at least one processor to:
parse first statements of programming code naming a first data type, the first data type having:
a first-data-type name;
an extensibility indicator indicating the first data type is extensible; and
a first-data-type element; and
parse second statements of the programming code, the second statements naming a second data type referencing the first data type, the second data type having:
a second-data-type element associated with an extension indicator, the second-data-type element referencing at least one of the first data type and the first-data-type element;
wherein the compiler further causes the at least one processor to:
create, responsive to the first data type, a first intermediate-language representation corresponding to the first data type;
create, for the first-data-type element, a second intermediate-language representation corresponding to the first-data-type element; and
create, responsive to the second data type:
a third intermediate-language representation corresponding to the second data type; and
a fourth intermediate-language representation with a reference to the second intermediate-language representation;
the third intermediate-language representation including a reference to the fourth intermediate-language representation.

19. The system of claim 18, wherein the compiler further causes the at least one processor to parse a third of the statements including a type casting of the first data type to the second data type and issuing an error message responsive to the type casting.

\* \* \* \* \*